(12) United States Patent
Zhang et al.

(10) Patent No.: US 7,631,856 B2
(45) Date of Patent: Dec. 15, 2009

(54) FIXING DEVICE

(75) Inventors: Bing-Jun Zhang, Shenzhen (CN); Lian-Zhong Gong, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/967,038

(22) Filed: Dec. 29, 2007

(65) Prior Publication Data

US 2009/0008848 A1 Jan. 8, 2009

(30) Foreign Application Priority Data

Jul. 6, 2007 (CN) .................. 2007 1 0201017

(51) Int. Cl.
*B23Q 1/00* (2006.01)
(52) U.S. Cl. ........................ 269/48.1; 269/95
(58) Field of Classification Search ............ 269/48.1, 269/50, 95, 138, 229, 196
See application file for complete search history.

(56) References Cited

U.S. PATENT DOCUMENTS

| | | | | |
|---|---|---|---|---|
| 3,031,995 A | * | 5/1962 | Taylor, Jr. ............ | 269/48.1 |
| 3,986,383 A | * | 10/1976 | Petteys ................ | 72/393 |
| 4,932,642 A | * | 6/1990 | Salenbien et al. ..... | 269/133 |
| 5,845,898 A | * | 12/1998 | Halder et al. ........ | 269/48.1 |
| 6,241,228 B1 | * | 6/2001 | Chupick .............. | 269/48.1 |
| 2009/0008848 A1 | * | 1/2009 | Zhang et al. ......... | 269/50 |

FOREIGN PATENT DOCUMENTS

CN 1765583 A 5/2006
JP 5-44733 A 2/1993

* cited by examiner

Primary Examiner—Lee D Wilson
(74) Attorney, Agent, or Firm—Frank R. Niranjan

(57) ABSTRACT

A fixing device for fixing a workpiece defining a hole, includes a fixing shaft, a sliding bar, and a sliding block. The fixing shaft is configured to be inserted in the hole of the workpiece and defines a groove therein along an axial direction thereof. The sliding bar is mounted to the fixing shaft and movable in the groove along the axial direction. The sliding block is mounted to the fixing shaft and movable in the groove along a radial direction of the fixing shaft. When the sliding bar moves forward along the axial direction, the sliding block is moved toward the sliding bar along the radial direction. When the sliding bar moves backward along the axial direction, the sliding block is driven to move away from the sliding bar along the axial direction to urge against a wall bounding the hole of the workpiece to fix the workpiece.

17 Claims, 6 Drawing Sheets

FIXING DEVICE

BACKGROUND

1. Field of the Invention

The present invention relates to fixing devices, and especially relates to a fixing device for fixing a workpiece defining a hole therein.

2. Description of Related Art

In machining or testing a workpiece, it is important to fasten the workpiece, which directly affects an accuracy of machining or testing.

For a workpiece defining a hole therein, which needs to be fastened via the hole, it is typically fastened by one of two ways.

Referring to FIG. 1, in one way, the workpiece 1 is clamped by two mandrels 2, with heads of the mandrels 2 partly inserted into the hole from opposite sides of the workpiece 1 respectively. However, in this way, the hole of the workpiece 1 should only be a through hole or the workpiece 1 should has two holes having a same axis and defined at opposite sides of the workpiece 1, and the workpiece is often skewed when clamped because a height H1 of one of the mandrels 2 may not equal to a height H2 of the other one of the mandrels 2.

Referring to FIG. 2, in the other way, the workpiece 1 is fastened by a mandrel 4, with a head of the mandrel 4 being inserted into the hole of the workpiece 1. However, because the hole of the workpiece 1 may not be accurately machined, a size of the hole may be greater or smaller than the head of the mandrel 4. When the size of the hole is smaller, the head of the mandrel 4 cannot be inserted into the hole. When the size of the hole is greater, a clearance can be formed around the head of the mandrel 4 in the hole, which leads to the workpiece 1 not being securely fastened.

What is needed is to provide a fixing device for fastening a workpiece with a hole therein.

SUMMARY

An embodiment of a fixing device for fixing a workpiece defining a hole therein, includes a fixing shaft, a sliding bar, and a sliding block. The fixing shaft configured to be inserted into the hole of the workpiece, defines a groove therein along an axial direction thereof. The sliding bar is mounted to the fixing shaft and movable in the groove of the fixing shaft along the axial direction. The sliding block is mounted to the fixing shaft and movable in the groove of the fixing shaft along a radial direction of the fixing shaft. When the sliding bar moves forward along the axial direction, the sliding block is moved toward the sliding bar along the radial direction. When the sliding bar moves backward along the axial direction, the sliding block is driven to move away from the sliding bar along the axial direction to urge against a wall bounding the hole of the workpiece to securely fix the workpiece.

Other advantages and novel features of the present invention will become more apparent from the following detailed description of an embodiment when taken in conjunction with the accompanying drawings, in which:

DETAILED DESCRIPTION

Figure 1:
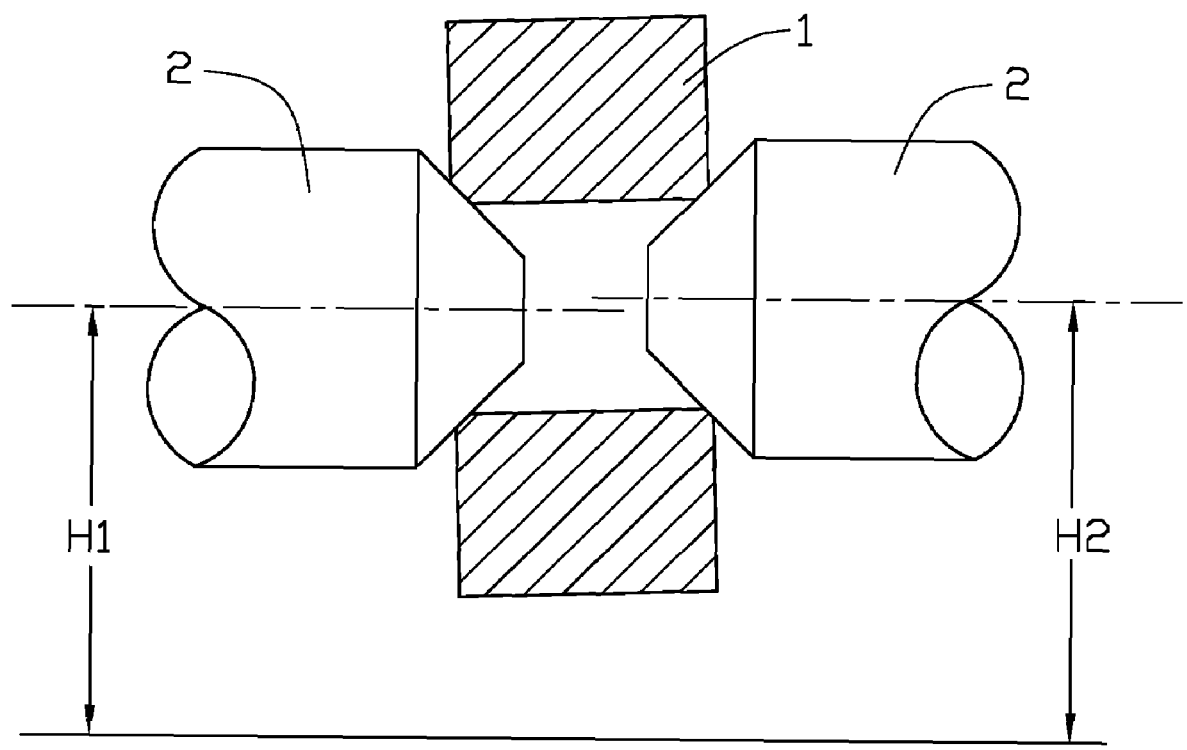
FIG. 1 is an assembled, cutaway view of a workpiece and two mandrels in a first typical way.
Figure 2:
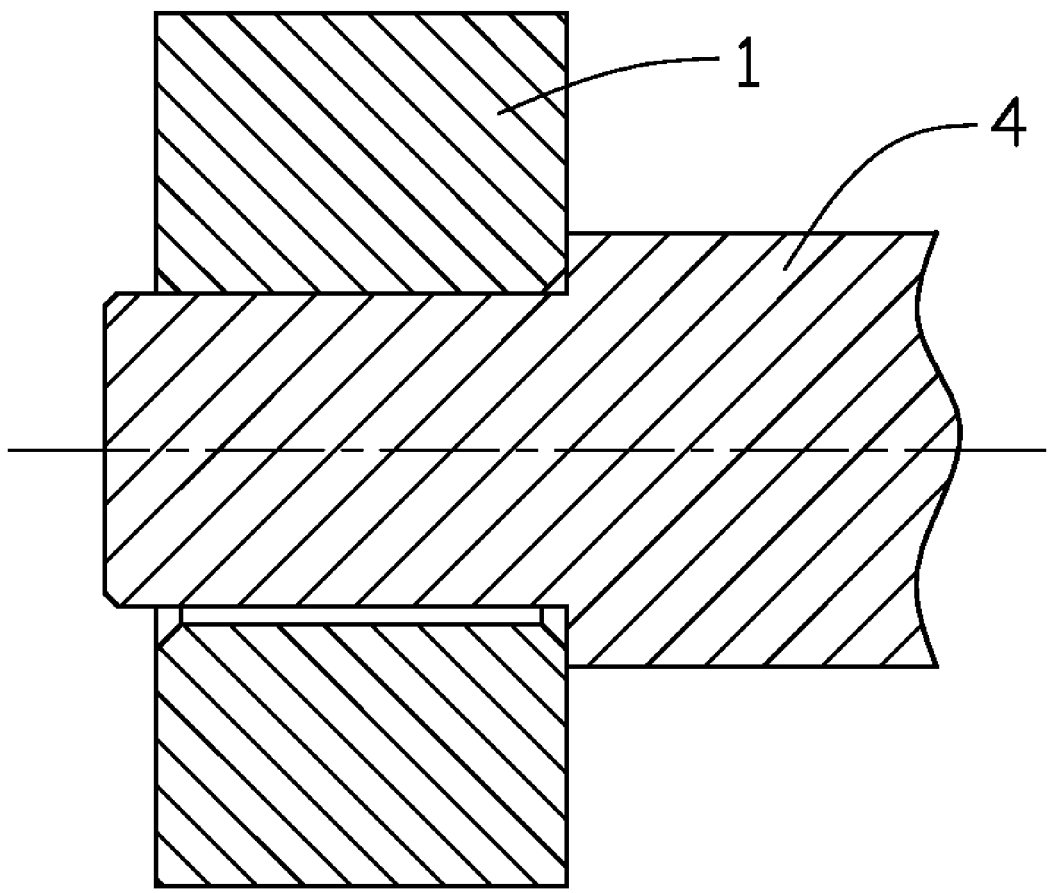
FIG. 2 is an assembled cutaway view of a workpiece and a mandrel in a second typical way.
Figure 3:
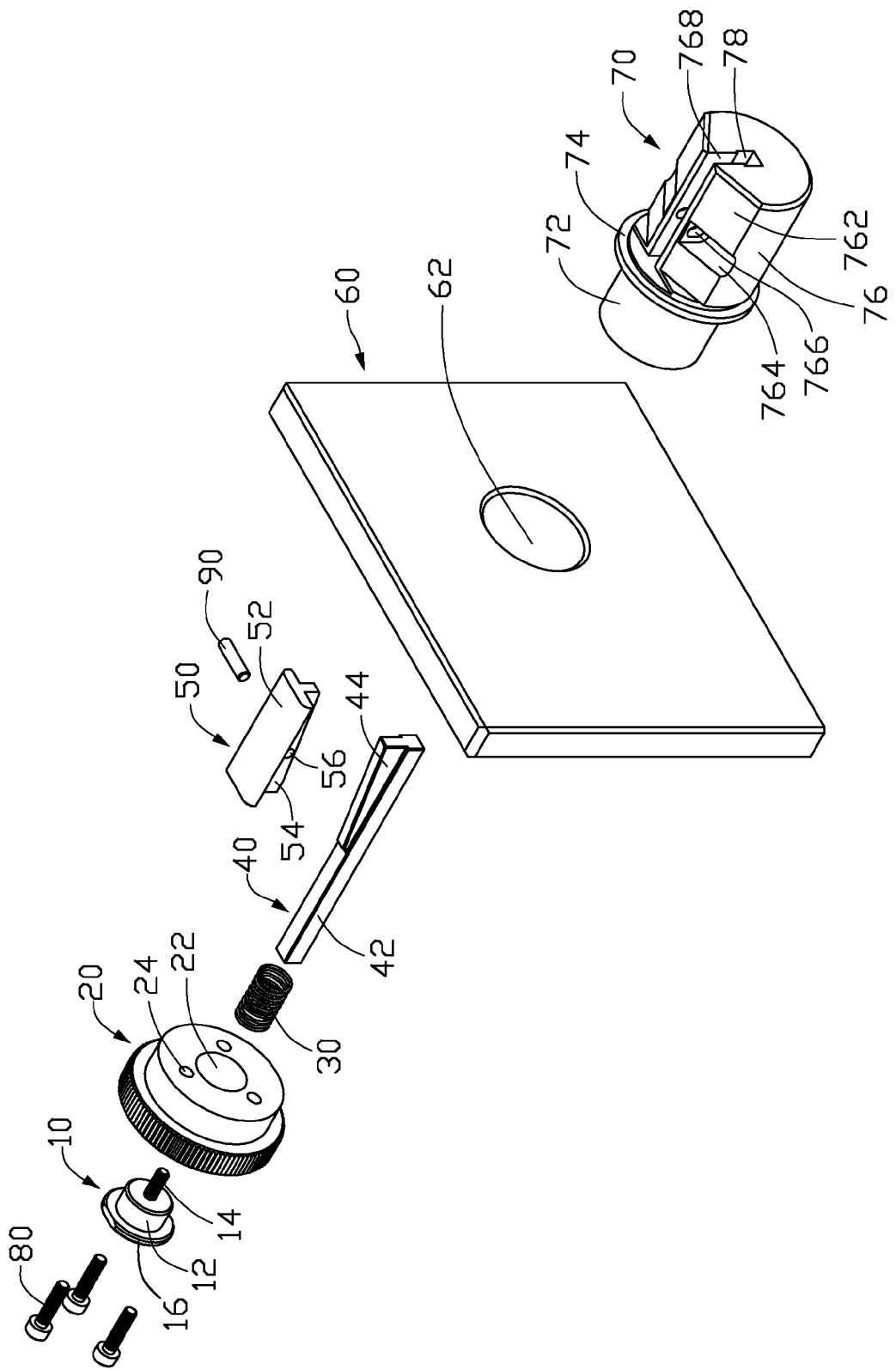
FIG. 3 is an exploded, isometric view of a fixing device in accordance with an embodiment of the present invention.

Referring to FIG. 3, a fixing device in accordance with an embodiment of the present invention for fixing a workpiece 1 with a hole (see FIG. 4) defined therein, includes a button 10, a turning member 20, a spring 30, a sliding bar 40, a T-shaped sliding block 50, a supporting board 60, and a fixing shaft 70.

The button 10 includes a circular operating portion 16, a column portion 12 coaxially extending from the operating portion 16, and a screw portion 14 coaxially extending from the column portion 12.

The turning member 20 includes a great column portion, and a small column portion coaxially extending from the great column portion. A plurality of skid-proof striae is formed on a circumference of the great column portion. A through hole 22 is defined in the turning member 20 along an axis thereof corresponding to the column portion 12 of the button 10. A plurality of assembly holes 24 is defined in the turning member 20 around the through hole 22.

The sliding bar 40 includes a strip 42, and a wedge-shaped piece 44 extending from a side of the strip 42 adjacent an end thereof. A screw hole 46 (see FIG. 5) is defined in the other end of the strip 42. The piece 44 includes an inclined surface at a top thereof. A width of the strip 42 is greater than that of the piece 44.

The T-shaped sliding block 50 includes a rectangular horizontal piece 52, and a wedge-shaped vertical piece 54 perpendicularly extending from a bottom of the horizontal piece 52. Both sides of the horizontal piece 52 are arc-shaped. An assembly hole 56 is defined in the vertical piece 54. The vertical piece 54 has an inclined surface at a bottom thereof, corresponding to the inclined surface of the piece 44 of the sliding bar 40. A width of the vertical piece 54 is equal to that of the piece 44 of the sliding bar 40.

The supporting board 60 is rectangular-shaped, and configured to be secured to a machining or testing apparatus for locating the fixing shaft 70. An opening 62 is defined in the supporting board 60.

The fixing shaft 70 includes a column-shaped rotating part 72 corresponding to the opening 62 of the supporting board 60, a fixing part 76, and a blocking part 74 connected between the rotating part 72 and the fixing part 76. The rotating part 72, the blocking part 74, and the fixing part 76 are coaxial. A through hole 78 is defined in the fixing shaft 70 along the axis thereof. The fixing part 76 is a column that is partly cutaway, such that two inclined surfaces 762 are symmetrically formed on a side of the fixing part 76. A slot 768 is defined in the fixing part 76 between the two inclined surfaces 762 and communicated with the through hole 78. A groove 764 is defined in each inclined surface 762 with a wall formed between the slot 768 and the groove 764. The grooves 764 are in alignment with each other. Two elliptic holes 766 are respectively defined in the walls in alignment with each other. A plurality of screw holes 722 (see FIG. 5) is defined in a free end surface of the rotating part 72 corresponding to the assembly holes 24 of the turning member 20.

Figure 4:
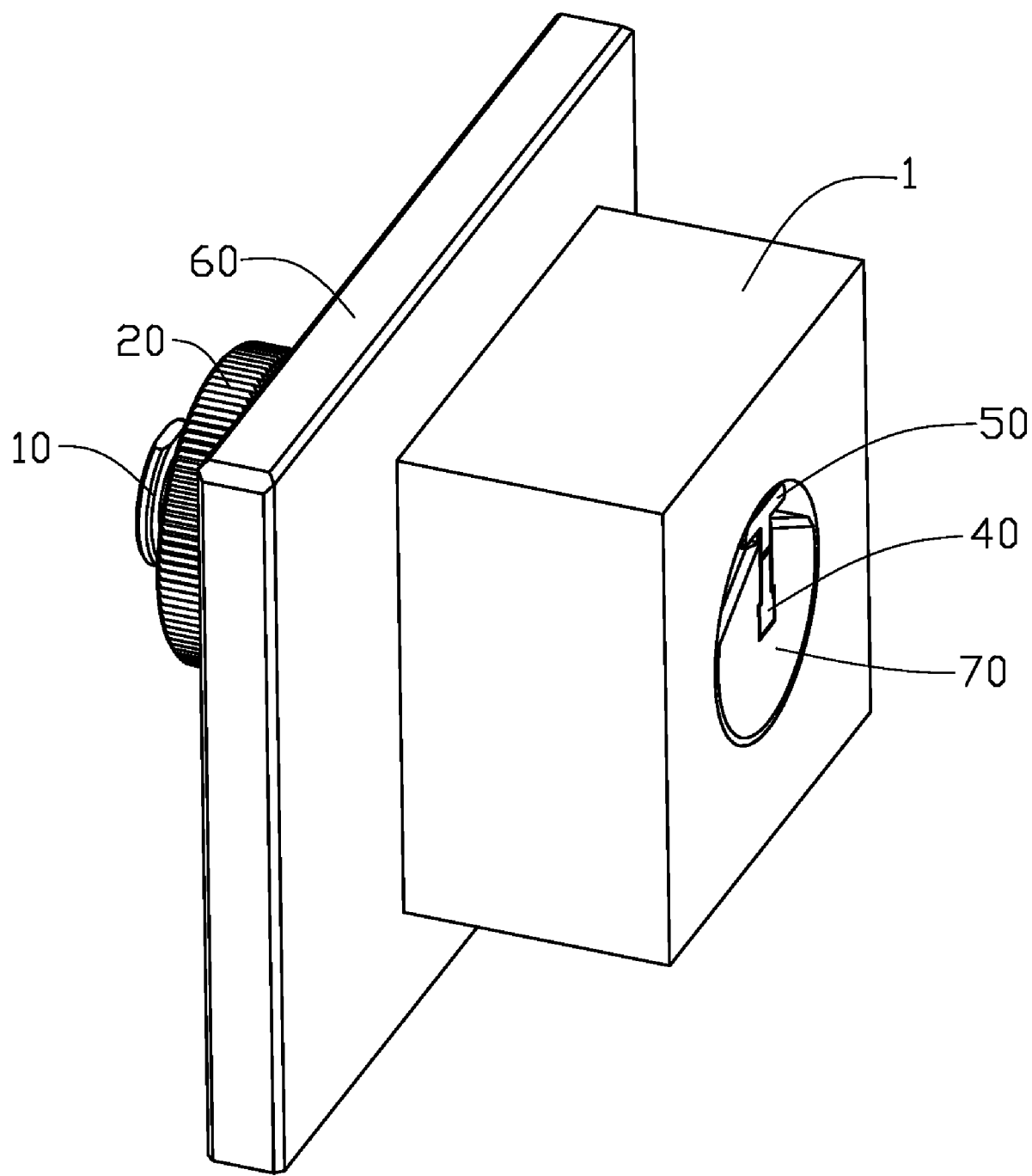
FIG. 4 is an assembled, isometric view of FIG. 3, together with a workpiece being fixed by the fixing device.
Figure 5:
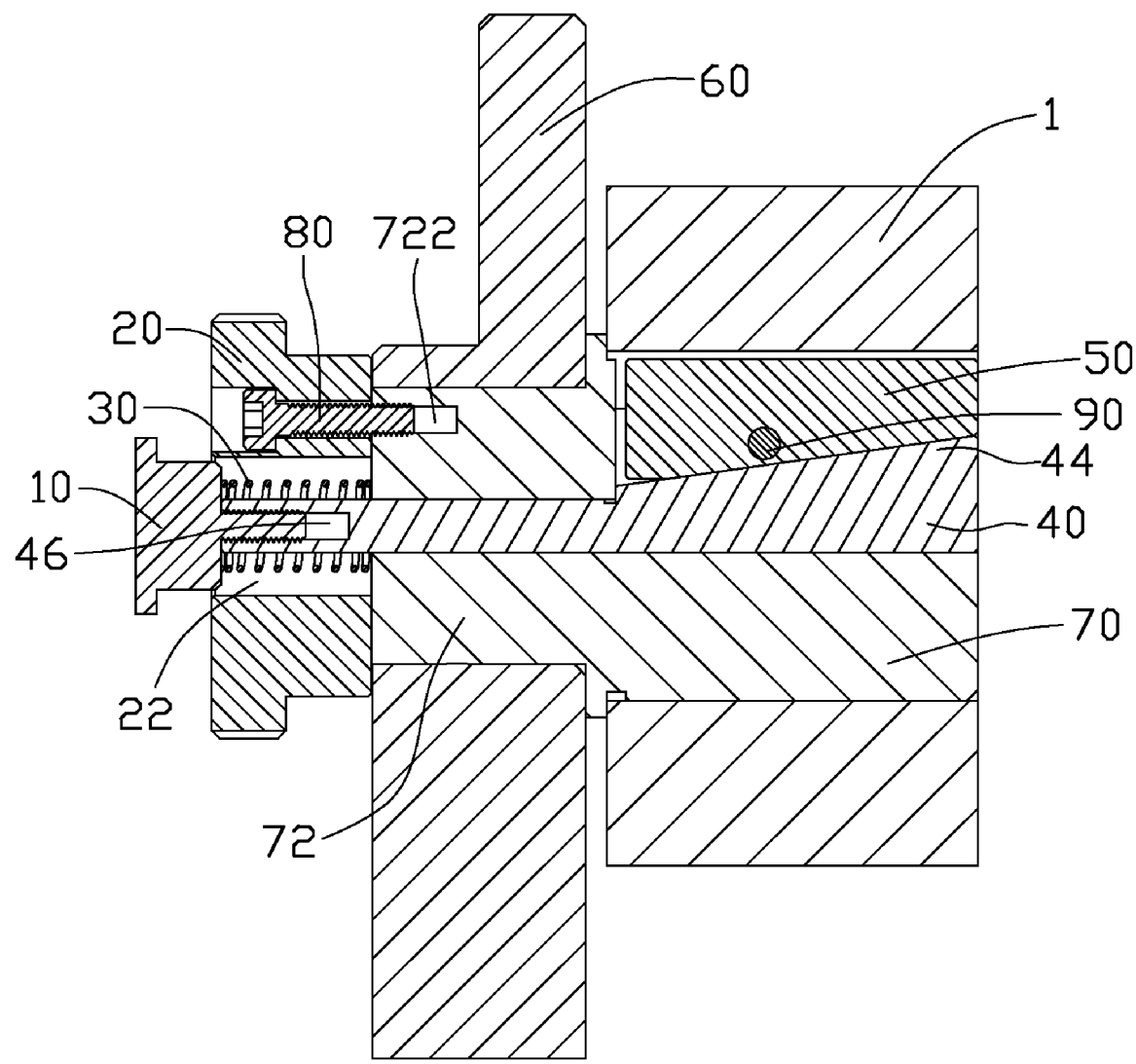
FIG. 5 is a cutaway view of FIG. 4.
Figure 6:
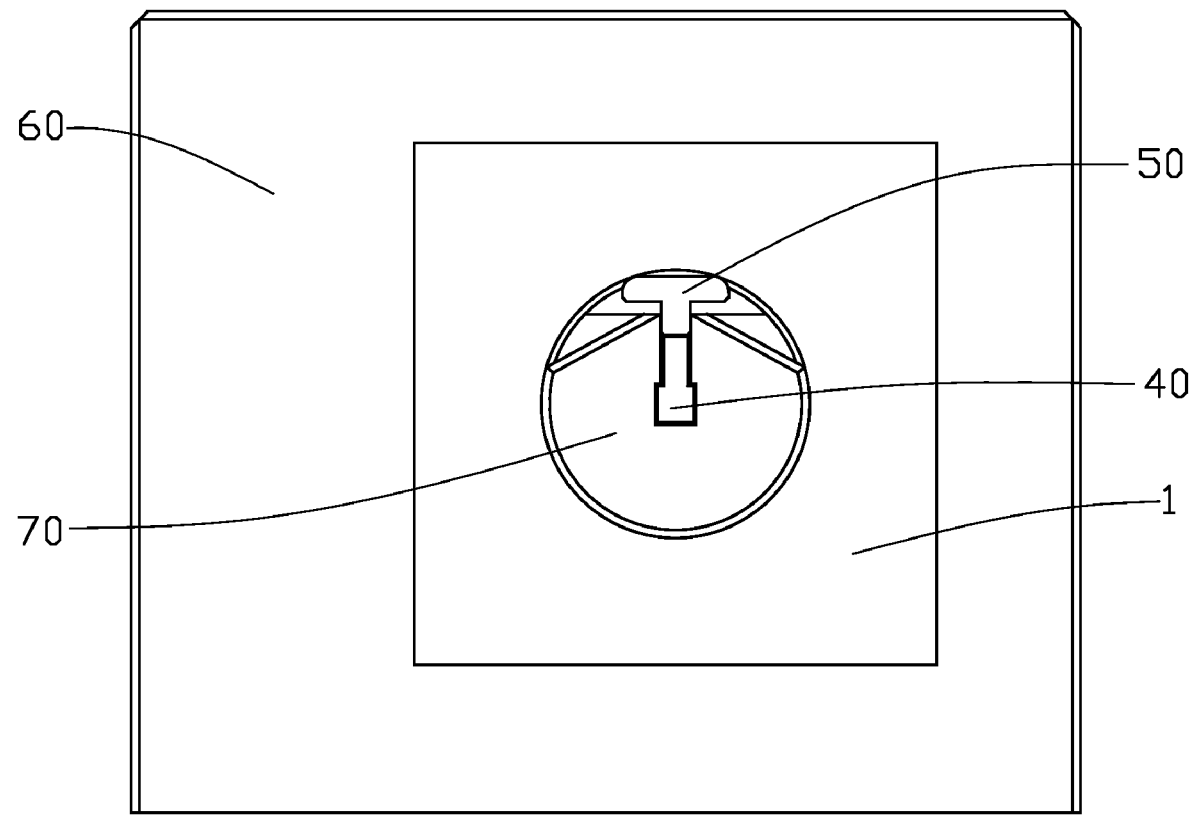
FIG. 6 is a right side elevational view of FIG. 4.

Referring also to FIGS. 4 to 6, in assembly, the free end of the rotating part 72 of the fixing shaft 70 is inserted though the opening 62 of the supporting board 60 and the blocking part 74 of the fixing shaft 70 touches the supporting board 60. The turning member 20 is fixed to the free end of the rotating part 72 of the fixing shaft 70 via a plurality of screws 80 being inserted through the assembly holes 24 of the turning member 20 and engaged in the corresponding screw holes 722 of the fixing shaft 70, such that the supporting board 60 is sandwiched between the blocking part 74 of the fixing shaft 70 and the turning member 20, and the rotating part 72 of the fixing shaft 70 is rotatably mounted to the supporting board 60. An end defining the screw hole 46 of the sliding bar 40 is inserted through the through hole 78 of the fixing shaft 70 and received in the through hole 22 of the turning member 20, with the wedge-shaped piece 44 of the sliding bar 40 received in the slot 768 of the fixing shaft 70. The spring 30 is fitted about the strip 42 of the sliding bar 40 and received in the through hole 22 of the turning member 20. The button 10 is fixed to the fixing shaft 70 via the screw portion 14 thereof being engaged in the screw hole 46 of the sliding bar 40, such that the spring 30 is sandwiched between the column portion 12 of the button 10 and the rotating part 72 of the fixing shaft 70, and the column portion 12 of the button 10 can move into the through hole 22 of the turning member 20 with deformation of the spring 30. The vertical piece 54 of the T-shaped sliding block 50 is received in the slot 768 of the fixing shaft 70 with the inclined surface thereof engaged with the inclined surface of the piece 44 of the sliding bar 40. A pin 90 is inserted through one elliptic hole 766 of the fixing shaft 70, and through the assembly hole 56 of the sliding block 50, and engaged in the other elliptic hole 766 of the fixing shaft 70, such that the pin 90 together with the sliding block 50 can be moved up and down along the elliptic holes 766.

In use, the button 10 is pressed to drive the sliding bar 40 together with the button 10 to slide along the through hole 78 of the fixing shaft 70 and the spring 30 is compressed, such that the T-shaped sliding block 50 can be moved down along the inclined surface of the wedge-shaped piece 44 of the sliding bar 40 because of the gravity. Thus, a size of the assembly of the fixing part 76 of the fixing shaft 70 and the sliding block 50 is reduced so as to be capable of being inserted into the hole of the workpiece 1. The button 10 is released, and the spring 30 rebounds to drive the button 10 together with the sliding bar 40 to move back. The T-shaped sliding block 50 is driven to slide along the inclined surface of the wedge-shaped piece 44 of the sliding bar 40 to move upward, with the horizontal piece 52 of the sliding block 50 urging against a wall bounding the hole of the workpiece 1, such that the workpiece 1 is fixed to the fixing shaft 70. The turning member 20 can be operated to rotate the workpiece 1. In other embodiments, the turning member 20 can be replaced by a motor driven gear.

Moreover, in other embodiments the spring 30 can be replaced by some other device, such as an air pressure device or a hydraulic pressure device capable of performing a same function.

It is to be understood, however, that even though numerous characteristics and advantages of the present invention have been set forth in the foregoing description, together with details of the structure and function of the invention, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A fixing device for fixing a workpiece defining a hole, comprising:
    a fixing shaft configured to be inserted into the hole of the workpiece, the fixing shaft defining a groove therein along an axial direction and extending to a surface thereof;
    a sliding bar mounted to the fixing shaft and being movably in the groove of the fixing shaft along the axial direction; and
    a sliding block being T-shaped and comprising a horizontal piece and a vertical piece perpendicularly extending form the horizontal piece, wherein the vertical piece is mounted to the fixing shaft and movable in the groove of the fixing shaft; wherein
    when the sliding bar moves forward along the axial direction, the sliding block is moved toward the sliding bar along the radial direction, when the sliding bar moves backward along the axial direction, the sliding block is driven to move away from the sliding bar along the radial direction, to urge against a wall bounding the hole of the workpiece via the horizontal piece to fix the workpiece.

2. The fixing device as claimed in claim 1, further comprising an elastic member, wherein the elastic member is configured between the fixing shaft and the sliding bar to supply a force to keep the sliding bar from sliding forward.

3. The fixing device as claimed in claim 2, wherein each of the sliding bar and the vertical piece of the sliding block comprises an inclined surface, the two inclined surfaces engage with each other to make the sliding block to move along the radial direction related to the sliding bar.

4. The fixing device as claimed in claim 3, further comprising a supporting board, wherein an opening is defined in the supporting board, the fixing shaft being mounted to the supporting board via engaging with the opening.

5. The fixing device as claimed in claim 4, further comprising a turning member, wherein the turning member is secured to an end of the fixing shaft, a through hole aligning with the groove of the fixing shaft is defined in the turning member, an end of the sliding bar being inserted though the groove of the fixing shaft and received in the through hole of the turning member, a blocking part is formed round the fixing shaft, the supporting board is sandwiched between the blocking part and the turning member.

6. The fixing device as claimed in claim 5, further comprising a button, wherein the button is secured to the end of the fixing bar and movably received in the though hole of the turning member, and configured to be operated to drive the sliding bar to move.

7. The fixing device as claimed in claim 6, wherein the elastic member is a spring.

8. The fixing device as claimed in claim 7, wherein the spring is fitted about the sliding bar and received in the through hole of the turning member, and the spring is sandwiched between the button and the corresponding end of the fixing shaft.

9. The fixing device as claimed in claim 5, wherein a plurality of skid-proof striae is defined in a circumference of the turning member.

10. The fixing device as claimed in claim 1, wherein an assembly hole is defined in the vertical piece of the sliding block, an ellipsoidal hole is defined in the fixing shaft perpendicular to the groove thereof, a pin is inserted through the ellipsoidal hole of the fixing shaft and engaged in the assembly hole of the sliding block, the pin is capable of being moved along the ellipsoidal hole to make the sliding block to move along the radial direction.

11. A fixing device for fixing a workpiece defining a hole, comprising:
    a supporting board defining an opening;
    a fixing shaft configured to be inserted into the hole of the workpiece, wherein the fixing shaft is rotatably mounted to the supporting board via being inserted in the opening of the supporting board, the fixing shaft defines a groove therein along an axial direction and extending to a surface thereof, a blocking part being formed around the fixing shaft;

a turning member secured to an end of the fixing shaft, wherein the supporting board is sandwiched between the turning member and the blocking part of the fixing shaft;

a sliding bar mounted to the fixing shaft and being movably in the groove of the fixing shaft along the axial direction; and a sliding block mounted to the fixing shaft and being movable in the groove of the fixing shaft along a radial direction of the fixing shaft; wherein when the sliding bar moves forward along the axial direction, the sliding block is moved toward the sliding bar along the radial direction, when the sliding bar moves backward along the axial direction, the sliding block is driven to move away from the sliding bar along the radial direction, to urge against a wall bounding the hole of the workpiece to fix the workpiece, wherein an elastic member is configured between the fixing shaft and the sliding bar to supply a force to keep the sliding bar from sliding forward.

12. The fixing device as claimed in claim 11, wherein a through hole aligning with the groove of the fixing shaft is defined in the turning member, an end of the sliding bar is inserted though the groove of the fixing shaft and received in the through hole of the turning member.

13. The fixing device as claimed in claim 12, further comprising a button, wherein the button is secured to the end of the fixing bar and movably received in the though hole of the turning member, and configured to be operated to drive the sliding bar to move.

14. The fixing device as claimed in claim 13, wherein the elastic member is a spring.

15. The fixing device as claimed in claim 14, wherein the spring is fitted about the sliding bar and received in the through hole of the turning member, and the spring is sandwiched between the button and the corresponding end of the fixing shaft.

16. A fixing device for fixing a workpiece defining a hole, comprising:

a supporting board defining an opening;

a fixing shaft configured to be inserted into the hole of the workpiece, wherein the fixing shaft is rotatably mounted to the supporting board via being inserted in the opening of the supporting board, the fixing shaft defines a groove therein along an axial direction and extending to a surface thereof, a blocking part being formed around the fixing shaft;

a turning member secured to an end of the fixing shaft, wherein the supporting board is sandwiched between the turning member and the blocking part of the fixing shaft;

a sliding bar mounted to the fixing shaft and being movable in the groove of the fixing shaft along the axial direction; and a sliding block mounted to the fixing shaft and being movable in the groove of the fixing shaft along a radial direction of the fixing shaft; wherein each of the sliding bar and the sliding block comprises an inclined surface, the two inclined surfaces engage with each other to make the sliding block to move along the radial direction related to the sliding bar;

the sliding block is T-shaped and comprises a horizontal piece, and a vertical piece perpendicularly extending form the horizontal piece, the inclined surface of the sliding block is formed on the vertical piece, the vertical piece is mounted to the fixing shaft and movable in the groove of the fixing shaft, the horizontal piece is located out of the groove of the fixing shaft;

when the sliding bar moves forward along the axial direction, the sliding block is moved toward the sliding bar along the radial direction, when the sliding bar moves backward along the axial direction, the sliding block is driven to move away from the sliding bar along the radial direction, to urge against a wall bounding the hole of the workpiece to fix the workpiece.

17. The fixing device as claimed in claim 16, wherein an assembly hole is defined in the vertical piece of the sliding block, an ellipsoidal hole is defined in the fixing shaft perpendicular to the groove thereof, a pin is inserted through the ellipsoidal hole of the fixing shaft and engaged in the assembly hole of the sliding block, the pin is capable of being moved along the ellipsoidal hole to make the sliding block to move along the radial direction.

* * * * *